(12) United States Patent
Suzuki et al.

(10) Patent No.: US 11,449,451 B2
(45) Date of Patent: Sep. 20, 2022

(54) INFORMATION PROCESSING DEVICE, INFORMATION PROCESSING METHOD, AND RECORDING MEDIUM

(71) Applicant: SONY CORPORATION, Tokyo (JP)

(72) Inventors: Seiji Suzuki, Kanagawa (JP); Kentaro Ida, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/772,623

(22) PCT Filed: Sep. 26, 2018

(86) PCT No.: PCT/JP2018/035729
§ 371 (c)(1),
(2) Date: Jun. 12, 2020

(87) PCT Pub. No.: WO2019/123754
PCT Pub. Date: Jun. 27, 2019

(65) Prior Publication Data
US 2021/0081343 A1    Mar. 18, 2021

(30) Foreign Application Priority Data

Dec. 21, 2017  (JP) .............................. JP2017-245033

(51) Int. Cl.
| | |
|---|---|
| *G06F 13/38* | (2006.01) |
| *G06F 3/01* | (2006.01) |
| *G06F 3/04815* | (2022.01) |
| *G06F 3/16* | (2006.01) |

(52) U.S. Cl.
CPC ............ *G06F 13/385* (2013.01); *G06F 3/013* (2013.01); *G06F 3/04815* (2013.01); *G06F 3/167* (2013.01)

(58) Field of Classification Search
CPC .... G06F 13/385; G06F 3/013; G06F 3/04815; G06F 3/167
USPC .......................................................... 710/63
See application file for complete search history.

(56) References Cited

U.S. PATENT DOCUMENTS

| | | | |
|---|---|---|---|
| 10,394,320 B2 * | 8/2019 | George-Svahn | ........ G06F 3/014 |
| 2006/0151223 A1 * | 7/2006 | Knoll | .................... B60K 35/00 |
| | | | 348/E7.087 |
| 2007/0061851 A1 * | 3/2007 | Deshpande | .......... H04N 21/426 |
| | | | 725/88 |

(Continued)

FOREIGN PATENT DOCUMENTS

| | | | |
|---|---|---|---|
| JP | 2007-336445 A | | 12/2007 |
| JP | 2007336445 A | * | 12/2007 |

(Continued)

*Primary Examiner* — Stephen S Hong
*Assistant Examiner* — Broderick C Anderson
(74) *Attorney, Agent, or Firm* — Paratus Law Group, PLLC

(57) ABSTRACT

There is provided an information processing device, an information processing method, and a recording medium that are configured to cause a user to intuitively notice to which control target device an operation command has been issued. The information processing device includes a control unit that executes a process of guiding a user's line of sight to a place of a control target device, and a process of controlling timing of running an operation command in the control target device, according to timing of guiding the line of sight.

19 Claims, 13 Drawing Sheets

(56) References Cited

U.S. PATENT DOCUMENTS

| | | | | |
|---|---|---|---|---|
| 2010/0077345 A1* | 3/2010 | Swingler | ............... | G06F 3/0481 |
| | | | | 715/802 |
| 2013/0194164 A1* | 8/2013 | Sugden | ................... | G06F 3/013 |
| | | | | 345/8 |
| 2015/0091794 A1* | 4/2015 | Ha | ........................ | G06F 3/013 |
| | | | | 345/156 |
| 2016/0009411 A1* | 1/2016 | Davalos | ................. | G06F 3/012 |
| | | | | 345/156 |
| 2016/0226823 A1* | 8/2016 | Ansari | ..................... | H04L 41/12 |
| 2017/0075420 A1* | 3/2017 | Yu | ........................ | G06F 3/0482 |

FOREIGN PATENT DOCUMENTS

| | | | |
|---|---|---|---|
| JP | 2014-140104 A | | 7/2014 |
| JP | 2015-090524 A | | 5/2015 |
| JP | 2016-169080 A | | 9/2016 |
| JP | 2016169080 A | * | 9/2016 |
| WO | WO 2010/044204 A | | 4/2010 |

* cited by examiner

INFORMATION PROCESSING DEVICE, INFORMATION PROCESSING METHOD, AND RECORDING MEDIUM

CROSS REFERENCE TO PRIOR APPLICATION

This application is a National Stage Patent Application of PCT International Patent Application No. PCT/JP2018/035729 (filed on Sep. 26, 2018) under 35 U.S.C. § 371, which claims priority to Japanese Patent Application No. 2017-245033 (filed on Dec. 21, 2017), which are all hereby incorporated by reference in their entirety.

FIELD

The present disclosure relates to an information processing device, an information processing method, and a recording medium.

BACKGROUND

In recent years, information processing devices such as smartphones, tablet terminals, and digital signage have been widely used, and in such information processing devices that are configured to perform complicated processing or display, development relating to display objects (i.e., UI: user interfaces) has been conducted from various points of view. For example, UIs that can be operated more intuitively by the users, UIs that can readily achieve complicated operations, UIs that improve user convenience, and the like have been developed. As an example, the following Patent Literature 1 discloses a technique for displaying a UI on a table to achieve an interaction between the UI and a user.

In recent years, with wide use of the Internet of Things (IoT), home appliances that are connected to networks so as to be operated in cooperation with other devices have been also widely used.

CITATION LIST

Patent Literature

Patent Literature 1: JP 2015-90524 A

SUMMARY

Technical Problem

A conventional device such as a television was operated independently without cooperating with other devices. Therefore, it was sufficient to provide feedback on a user's operation by using a display or LED installed on the device. However, when the number of home appliances connected to networks and operated in cooperation with other devices (e.g., cooperation with UIs displayed on tables) also increases with wide use of IoT, problems occur that it is difficult for the users to notice the feedback from the device.

Therefore, the present disclosure proposes an information processing device, an information processing method, and a recording medium that are configured to cause a user to intuitively notice to which control target device an operation command has been issued.

Solution to Problem

According to the present disclosure, an information processing device is provided that includes a control unit that executes: a process of guiding a user's line of sight to a place of a control target device; and a process of controlling timing of running an operation command in the control target device, according to timing of guiding the line of sight.

According to the present disclosure, an information processing method is provided that includes: guiding, by a processor, a user's line of sight to a place of a control target device; and controlling, by the processor, timing of running an operation command in the control target device, according to timing of guiding the line of sight.

According to the present disclosure, a recording medium is provided that records a program causing a computer to function as a control unit executing: a process of guiding a user's line of sight to a place of a control target device; and a process of controlling timing of running an operation command in the control target device, according to timing of guiding the line of sight.

Advantageous Effects of Invention

As described above, according to the present disclosure, it is possible to cause the user to intuitively notice which control target device an operation command has been issued to.

Note that the effects described above are not necessarily limitative, and with or in place of the above effects, there may be achieved any one of the effects described in this description or other effects that may be grasped from this description.

DESCRIPTION OF EMBODIMENTS

Figure 1:
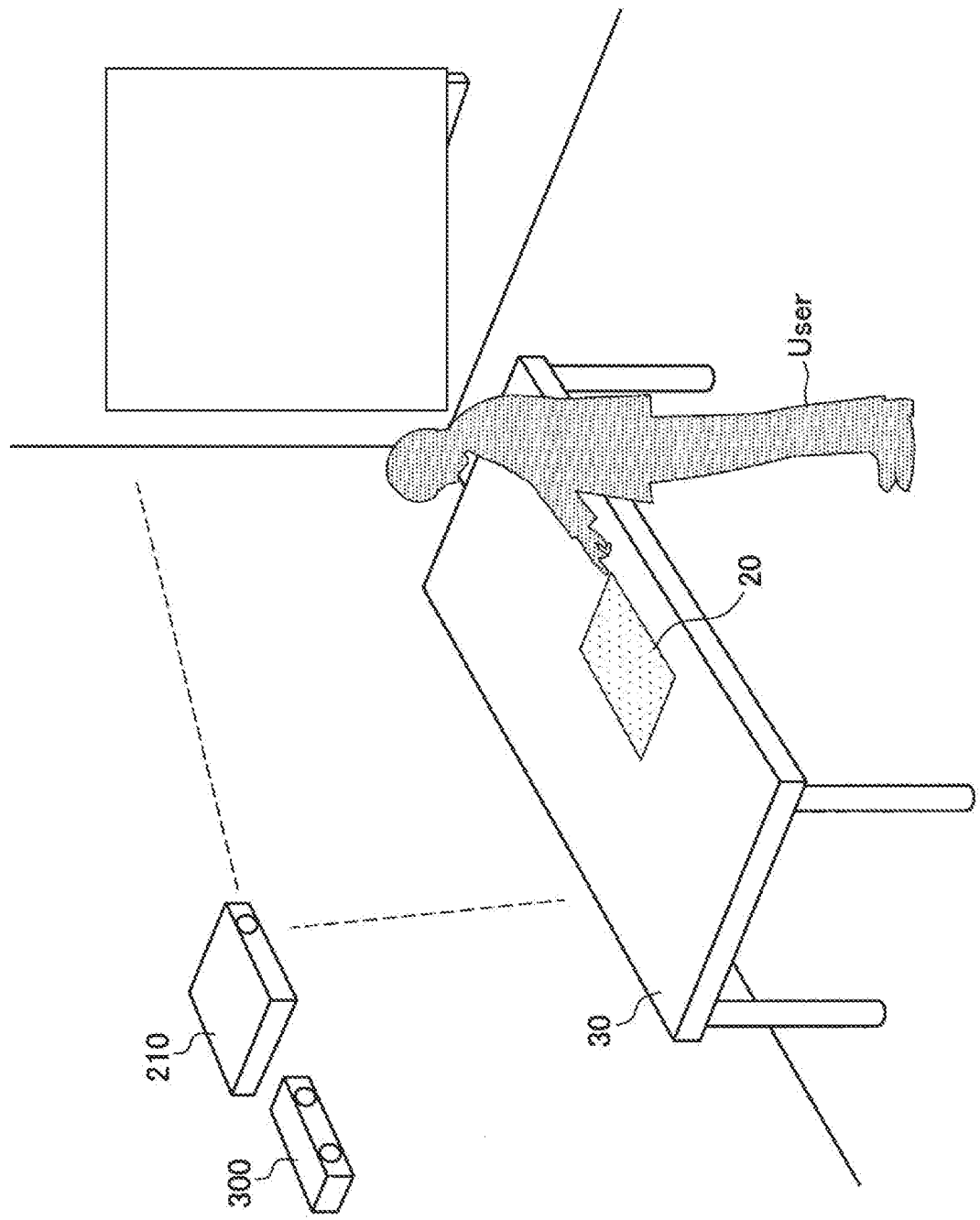
FIG. 1 is a diagram illustrating an overview of an information processing system according to an embodiment of the present disclosure.

Hereinafter, preferred embodiments of the present disclosure will be described in detail with reference to the accompanying drawings. Note that, in this description and the drawings, component elements having substantially the same functional configurations are denoted by the same reference numerals and repeated description thereof is omitted.

A description will be made in the following order.
1. Overview of information processing system according to embodiment of present disclosure
2. Configuration example
2-1. Output device 200
2-2. Sensor device 300
2-3. Information processing device 100
3. Operation processing
3-1. Calling agent
3-2. Process of device control
3-3. Transfer presentation process performed by device
3-4. Transfer presentation process performed by system
3-5. Supplementary notes
4. Application examples
5. Hardware configuration example
6. Conclusion

1. OVERVIEW OF INFORMATION PROCESSING SYSTEM ACCORDING TO EMBODIMENT OF PRESENT DISCLOSURE

FIG. 1 is a diagram illustrating an overview of an information processing system according to an embodiment of the present disclosure. The information processing system according to the present embodiment includes an information processing device 100 (not illustrated in FIG. 1), an output device 200 (in FIG. 1, a projector 210 and a TV 220 are illustrated as an example) and a sensor device 300.

The sensor device 300 is a device that senses various information. For example, the sensor device 300 includes a camera, a depth sensor, a microphone, and the like to sense information about a user and a space where the user is located. For example, the sensor device 300 senses a user's position, posture, movement, and line of sight, a room shape, furniture arrangement, and the like.

The output device 200 is a device that outputs various information from the information processing device 100, assuming, for example, the projector 210 and the TV 220. The projector 210 is configured to project information onto an appropriate place (i.e., area) serving as a projection location (i.e., projection surface or projection area). The appropriate place includes a wall, floor, table, or other furniture in a space in which the sensor device 300 performs sensing. Note that the projection location is not limited to a flat surface and may have a curved surface or may be divided into a plurality of surfaces. Furthermore, the projector 210 is achieved by a plurality of projectors or a so-called moving projector so that projection is made on anything in the space.

Single or a plurality of the output devices 200 and sensor devices 300 may be used.

In an example illustrated in FIG. 1, a display image 20 is displayed on a top surface of a table 30 by the projector 210. The display image 20 is a display object indicating an interaction from an application in response to a user's input and includes, for example, various UIs such as a still image, moving image (video), a menu screen, or a control screen.

The user's operation input to the display image 20 is detected by the sensor device 300, and the user can touch the display image 20 with an operation tool, for example, a hand or move the operation tool near the display image 20 to perform various operation inputs to the display image 20.

A display position of the display image 20 is not limited to the top surface of the table 30 and may be any place, such as a wall, floor, or furniture in the space, and the display position of the display image 20 is controlled automatically or according to a user's instruction.

Here, in a case where devices (e.g., IoT devices such as home appliances) in the space are communicatively connected to the information processing device 100, the information processing device 100 enables to control on/off or the like of each device by user's operation input to the control screen (the display image 20) displayed on the table 30. At this time, since the user operates while looking at the control screen, it may be difficult for the user to notice which device is actually operating under his/her control. Furthermore, for example, when the user operates the control screen to bring the inside of his/her house into a movie mode, a number of devices operate in cooperation with each other, for example, the image quality of a TV is brought into the movie mode, an audio system is set to a deep-bass mode, and ceiling light is darkened. However, a large number of changes occur at the same time, and the user may not understand what happened in a moment.

Here, as an example, problems have been described using an example of operation from the control screen displayed on the table 30, but the similar problems occur when the user performs operation by using an application that operates on a smartphone.

In order to address such problems, the present disclosure proposes a mechanism that presents appropriate feedback to the user and makes it possible to cause the user to intuitively notice whether an operation command is issued to which control target device.

Specifically, in the present disclosure, processing is performed as follows. Line of sight of the user is guided to the position of a device where an operation command is to be run, that is, the place of a control target device, and a timing of running the operation command in the control target device is controlled according to according timing of guiding the line of sight. Specifically, the user's line of sight is guided to the control target device to control the control target device to present feedback (if possible, feedback presentation using a characteristic of the device) indicating that the operation command has acted on the control target device after completion of the guidance, and it is possible to cause the user to intuitively notice the action on the control target device.

2. CONFIGURATION

Figure 2:
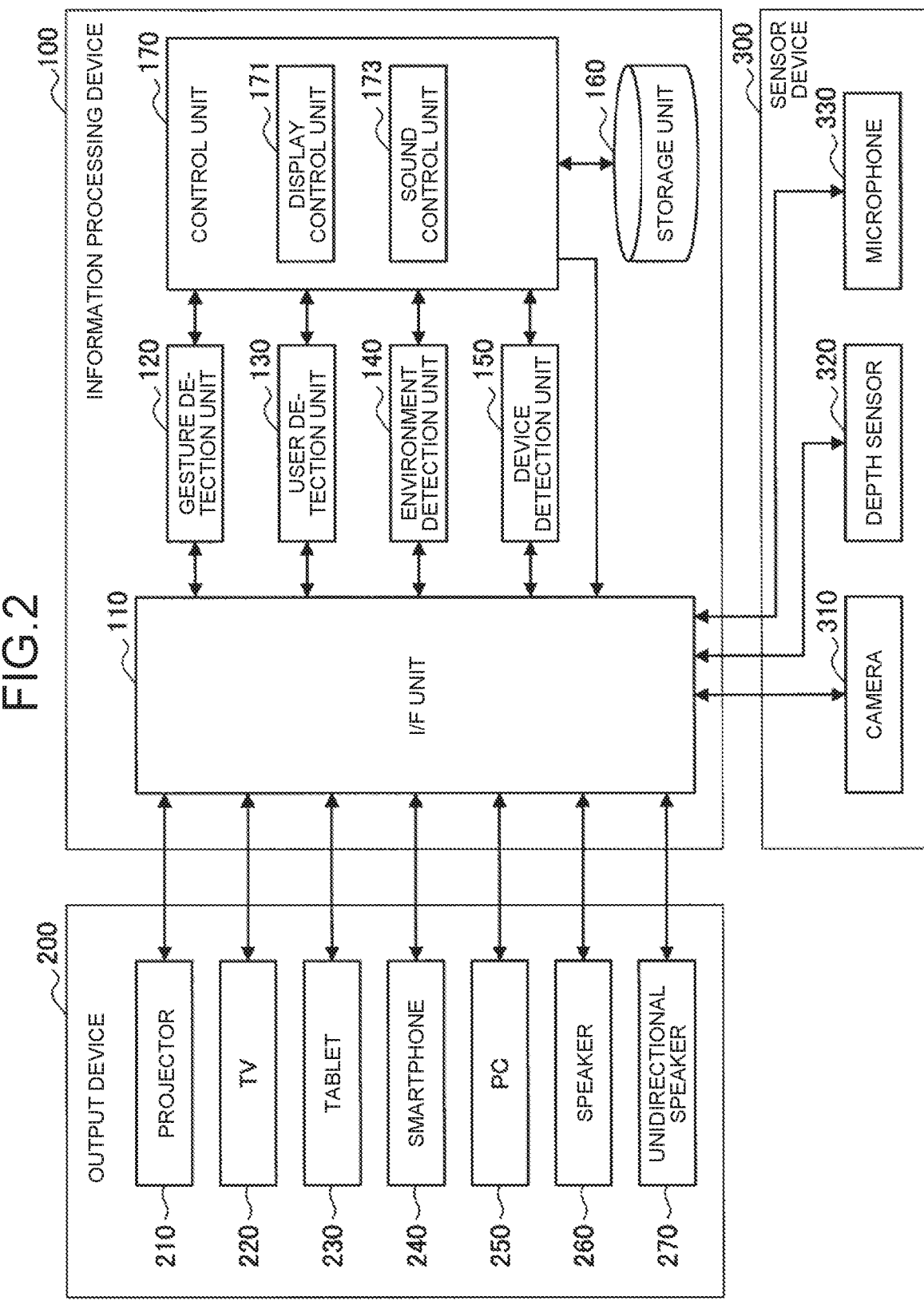
FIG. 2 is a block diagram illustrating an example of a configuration of a system according to the present embodiment.

FIG. 2 is a block diagram illustrating an example of a configuration of a system 1 according to the present embodiment. As illustrated in FIG. 2, the system 1 includes an information processing device 100, an output device 200, and a sensor device 300.

<2-1. Output Device 200>

The output device 200 includes a projector 210, a TV 220, a tablet 230, a smartphone 240, a PC 250, a speaker 260, and a unidirectional speaker 270. Note that the system 1 may include, as the output device 200, one of the projector 210, the TV 220, the tablet 230, the smartphone 240, the PC 250, the speaker 260, and the unidirectional speaker 270 or a combination of a plurality thereof or may include a plurality of devices of the same type.

The projector 210 is a projection device that projects an image onto any place in a space. The projector 210 may be, for example, a stationary wide-angle projector or a so-called moving projector including a panning/tilting movable portion operable to change a projection direction. The TV 220 is a device that receives a radio wave of television broadcast and outputs an image and sound. The tablet 230 is typically a mobile device that has a screen larger than the smartphone 240 and is wirelessly communicable, and the tablet 230 is configured to output an image, sound, vibration, or the like. The smartphone 240 is typically a mobile device that has a screen smaller than the tablet 230 and is wirelessly communicable, and the smartphone 240 is configured to output an image, sound, vibration, or the like. The PC 250 may be a stationary desktop PC or a mobile notebook PC and is configured to output an image, sound, and the like. The speaker 260 converts voice data into an analog signal via a digital analog converter (DAC) and an amplifier and outputs (reproduces) the analog signal. The unidirectional speaker 270 is a speaker that is configured to form directivity in a single direction.

The output device 200 outputs information on the basis of control by the information processing device 100. The information processing device 100 is configured to control an output method in addition to the contents of the information output. For example, the information processing device 100 is configured to control the projection direction of the projector 210 or control the directivity of the unidirectional speaker 270.

Note that the output device 200 may include a component element that enables any output operation, instead of the component elements described above. For example, the output device 200 may include a wearable device such as a head mounted display (HMD), augmented reality (AR) glass, and a clock-type device.

Furthermore, the output device 200 may include a lighting device, an air conditioner, a music reproduction device, or the like.

<2-2. Sensor Device 300>

The sensor device 300 includes a camera 310, a depth sensor 320, and a microphone 330.

The camera 310 is an imaging device, such as an RGB camera, that includes a lens system, a driving system, and an imaging element and captures an image (still image or moving image). The depth sensor 320 is a device that acquires depth information of an infrared distance measuring device, ultrasonic distance measuring device, laser imaging detection and ranging (LiDAR), stereo camera, or the like. The microphone 330 is a device that collects surrounding sounds and outputs voice data converted into digital signals via an amplifier and an analog digital converter (ADC). The microphone 330 may have an array microphone.

The sensor device 300 senses information on the basis of control by the information processing device 100. For example, the information processing device 100 is configured to control the zoom factor and imaging direction of the camera 310.

Note that the sensor device 300 may include a component element that enables any sensing operation, instead of the component elements described above. For example, the sensor device 300 may include a device, such as a mouse, keyboard, touch panel, button, switch, or lever, to which information is input by the user. Furthermore, the sensor device 300 may include various sensors, such as an acceleration sensor, gyro sensor, a geomagnetic sensor, optical sensor, illuminance sensor, force sensor, ultrasonic sensor, atmospheric pressure sensor, a gas sensor (Co2), and thermo-camera.

<2-3. Information Processing Device 100>

The information processing device 100 includes an interface (I/F) unit 110, a gesture detection unit 120, a user detection unit 130, an environment detection unit 140, a device detection unit 150, a storage unit 160, and a control unit 170.

I/F unit 110

The I/F unit 110 is a connection device that connects the information processing device 100 to another device. The I/F unit 110 is achieved by, for example, a universal serial bus (USB) connector and inputs and outputs information to and from each component element of the output device 200 and sensor device 300.

Gesture Detection Unit 120

The gesture detection unit 120 has a function of detecting gesture information about the user on the basis of information sensed by the sensor device 300. The gesture information can be detected by, for example, a depth camera, thermo-camera, RGB camera, or ultrasonic sensor. The gesture information includes, for example, information on the user's hand movement, arm movement, posture (e.g., bone information), line of sight, and touch operation. More specifically, the gesture detection unit 120 detects, as the gesture information, a direction indicating movement, such as finger pointing, head movement, or a line of sight or detects a touch operation to a projection location such as a wall, floor, table, other furniture, or the like. The touch operation is also detected as user's operation input to a display image projected on a wall, a floor, furniture, or the like. For example, when a display image 20 is displayed on the table 30, the gesture detection unit 120 analyzes a captured image or depth information input from the sensor device 300, acquires the position or depth information (i.e., three-dimensional information) of the user's hand or finger positioned on a displayed screen, and detects touching/approaching and removal of the user's hand to and from the table 30 in a height direction. In the present description, the user's touching or approaching information or the display screen with an operation tool such as a hand is also referred to as "touch".

The gesture detection unit 120 outputs detected gesture information to the control unit 170.

User Detection Unit 130

The user detection unit 130 has a function of detecting information about a user (user information) on the basis of information sensed by the sensor device 300.

The user information can include information indicating the positions and the number of users in a space sensed by the sensor device 300. The positions and the number of users can be detected by a thermo-camera, RGB camera, infrared sensor, ultrasonic sensor, or the like.

The user information can include information indicating a user's line of sight. The information indicating a user's line of sight includes information indicating a viewpoint position and a line-of-sight direction. The information indicating a user's line of sight may include information indicating the direction of the user's face or head or may further include information indicating the direction of an eyeball. The information indicating a user's line of sight can be detected by analyzing an image of a user's eye obtained by an RGB camera, an infrared camera, an eye camera worn by the user, or the like.

The user information can include information indicating a posture of the user. The information indicating a posture of the user can be detected by analyzing an image obtained by an RGB camera, an infrared camera, or the like.

The user information can include information indicating user's spoken voice. The information indicating user's spoken voice can be detected by analyzing voice information obtained by a microphone.

The user detection unit 130 outputs detected user information to the control unit 170.

Environmental Detection Unit 140

The environment detection unit 140 has a function of detecting environment information on the basis of information sensed by the sensor device 300. The environment information is information about a space where the user is. The environment information can include diverse information.

The environment information may include information indicating the shape of a space where the user is. The information indicating the shape of a space includes, for example, information indicating the shape of an object forming the space, such as a wall surface, ceiling, floor, door, furniture, or housewares. The information indicating the shape of a space may have two-dimensional information or three-dimensional information such as a point cloud. The information indicating the shape of a space can be detected on the basis of depth information obtained by, for example, infrared distance measurement, ultrasonic distance measurement, a stereo camera, or the like.

The environment information may include information indicating a state of a projection surface. The state of a projection surface represents, for example, unevenness and color of the projection surface. The unevenness of the projection surface can be detected on the basis of depth information obtained by, for example, LiDAR. The color of the projection surface can be detected by analyzing, for example, an image captured by an RGB camera.

The environment information can include information indicating the brightness of a projection surface. The brightness of a projection surface can be detected by an illuminance sensor or an RGB camera.

The environment information can include information indicating the position (three-dimensional position) of an object in a space. For example, the position of a cup, chair, table, electronic device, or the like in a room can be detected by image recognition. Furthermore, for example, the position of a smartphone in a room can be detected by radio-wave strength relating to communication between the smartphone and an access point of a wireless LAN.

The environment information can include environmental sounds. The environmental sounds can be detected by a microphone.

The environment detection unit 140 outputs detected environment information to the control unit 170.

The device detection unit 150 has a function of detecting information (device information) about a device in a space. The device information can include the presence of a device and a three-dimensional position of the device.

The information processing device 100 is connected to each device (output device 200) via the I/F unit 110. For example, the I/F unit 110 is connected to each device in a space by a wireless/wired local area network (LAN), Digital Living Network Alliance (DLNA) (registered trademark), Wi-Fi (registered trademark), Bluetooth (registered trademark), USB connection, or another dedicated line. The device detection unit 150 grasps the presence of each device by the connection of the device via the I/F unit 110.

The three-dimensional position of a device can be identified on the basis of information sensed by the sensor device 300. For example, the device detection unit 150 may extract a retroreflective material provided at a device by analyzing an infrared image captured by an infrared (IR) camera of the sensor device 300 and identify the position of the device in a space. Furthermore, the device detection unit 150 may extract a specific pattern (manufacturer name, two-dimensional barcode, or the like) provided at a device by analyzing a captured image captured by a camera (RGB camera) of the sensor device 300 and identify the position of the device in a space. Still furthermore, the device detection unit 150 may acquire a unique ultrasonic wave transmitted from each device with the microphone of the sensor device 300 and identify the position of the device in a space. In addition, the device detection unit 150 may sense, by the sensor device 300, a position specification operation (e.g., pointing, touching, line of sight, or placing a marker) and registration operation (UI selection, voice speech, or the like) by the user and identify the position of a device in a space.

The device detection unit 150 outputs detected device information to the control unit 170.

The function of detecting information about a person, environment, and device in a space has been described. In this description, the detection of each information by the gesture detection unit 120, the user detection unit 130, the environment detection unit 140, and the device detection unit 150 corresponds to space recognition, and obtained information (result of space environment sensing process) Is also referred to as spatial information.

Control unit 170

The control unit 170 controls overall operations in the information processing device 100 according to various programs. The control unit 170 includes a display control unit 171 and a sound control unit 173. The display control unit 171 controls display performed by the output device 200. The sound control unit 173 controls sound output by the output device 200.

Furthermore, the control unit 170 can control operations of various devices connected via the I/F unit 110. A device that can be controlled by the information processing device 100 is also referred to as "control target device". The control target device includes, in addition to the example of the output device 200 described above, an IoT home appliance such as a washing machine or refrigerator, various IoT devices for a toy, furniture, and private car, and home facilities such as floor heating, bath water heater, bathroom dryer, a lock of a door/window, window shutter, and garage. The control unit 170 sends an instruction command (control signal) for predetermined control to the control target device via the I/F unit 110.

Furthermore, the control unit 170 acquires an operation command on/on the basis of information acquired from inside the space.

For example, the control unit 170 analyzes a user's voice speech, operation input (a gesture or operation on a control screen displayed in a space), a user's situation, or the like and acquires the operation command relating to the control of the control target device.

Specifically, for example, the control unit 170 acquires a character string from voice information (spoken voice)

collected by the microphone 330 by using a voice recognition engine, further performs syntax analysis to recognize the content of the user's speech, and detects an operation trigger. The operation trigger may be a predetermined keyword (e.g., system name, call to the system, etc.) or an operation instruction (e.g., "display", "show", "transfer to a oo mode", "turn on a light" etc.). When the trigger is detected, the control unit 170 generates an operation command. The operation command is a control signal for causing a device in a space to execute an operation. The control unit 170 acquires a control target device and a control content from a recognized content of user's speech and generates an operation command. For example, when the user says "Turn on the TV", the control unit 170 effectively recognizes the user's speech as a "TV_ON command".

In addition, the control unit 170 may analyze a situation, for example, where the user seems to be cold and recognize a valid command such as turning on a heater. In this case, the control unit 170 may cause an agent to be displayed and present a command content to the user, for example, "Would you like to turn on a heater?" or "I will turn on a heater", before issuing an operation command.

Next, before issuing (sending) the generated operation command to the control target device, the control unit 170 performs a user's gaze guiding process. In other words, the control unit 170 according to the present embodiment guides a user's line of sight to the control target device, controls the operation of the control target device according to a guiding timing (controls timing of running the operation command in the control target device), and it is possible to cause the user to intuitively notice the action on the control target device. The gaze guiding process is performed, for example, by image or sound. For example, the control unit 170 performs control of sending the operation command to the control target device at a timing at which the gaze guidance is finished. The timing at which the gaze guidance is finished represents, for example, a timing at which a guide image reaches the position of the control target device. For example, the guide image being within a predetermined distance from an end of the control target device or within a predetermined distance from the position of the center of gravity of the control target device may be determined as "arrival of the guide image at the position of the control target device". More specifically, for example, the control unit 170 guides the user's line of sight to the control target device by displaying the guide image in a direction of the user's line-of-sight by the projector 210 and moving the guide image to the position of the control target device. Then, after moving the guide image to the position of the control target device, the control unit 170 issues an operation command to the control target device to operate the control target device (e.g., turning on the TV). "Timing at which the gaze guidance is finished" is not limited to the above example and may be, for example, a timing at which the guide image reaches the position of the control target device and the direction of the user's line-of-sight is directed to the control target device. Alternatively, "timing at which the gaze guidance is finished" may be a timing at which the guide image reaches the position of the control target device and the control unit 170 receives an operation command running preparation completion notification from the control target device (assuming that the information processing device 100 has sent an execution preparation instruction command for the operation command to the control target device in advance).

Furthermore, the control unit 170 may move the guide image to the position of the control target device, control output of transfer presentation of the guide image to the control target device before issuing an operation command to the control target device, and then issue the operation command to the control target device. The output of transfer presentation enables intuitive indication to the user that the control by the system has acted on the control target device. For the control of output of transfer presentation, for example, sound output from the control target device, image display, vibration, movement, or projection of a predetermined image onto the control target device by the projector 210 is assumed. For example, when the control target device slightly moves after the guide image is moved to the position of the control target device, the user can intuitively recognize that the control by the system has acted on the control target device. Furthermore, the control unit 170 may issue an operation command to the control target device at a timing at which control of output of such transfer presentation is completed.

The control unit 170 is further operable to identify a person who speaks. In this system, since the positions and postures of all users in a space are periodically recognized by the user detection unit 130 and the environment detection unit 140, the control unit 170 acquiring a voice signal of a certain volume or higher with the microphone identifies a direction of a person who speaks by using a microphone array and identifies the person who speaks by referring to the positions of all users recognized in advance. Thus, for example, it becomes possible for the control unit 170 to display the guide image in a line-of-sight direction of the person who speaks as described above.

Storage Unit 160

The storage unit 160 is achieved by a read only memory (ROM) that stores a program, an operation parameter, and the like used in the processing of the control unit 170, and a random access memory (RAM) that temporarily stores appropriately changing parameters and the like. Furthermore, the storage unit 160 stores gesture information detected by the gesture detection unit 120, user information detected by the user detection unit 130, environment information detected by the environment detection unit 140, and device information detected by the device detection unit 150, and the like.

The configurations of the information processing device 100 according to the present embodiment have been specifically described above. Note that the configurations of the information processing device 100 are not limited to the example illustrated in FIG. 2. For example, the information processing device 100 may be in the same space as the output device 200 and the sensor device 300, or may be in another space. Furthermore, the information processing device 100 may be on a network. Still furthermore, at least some of the configurations of the information processing device 100 may be provided in an external device. By appropriately distributing the configurations of the information processing device 100, it is possible to improve a real-time property, reduce a processing load, and ensure security.

3. OPERATION PROCESSING

Next, operation processing of the information processing system according to the present embodiment will be specifically described with reference to the drawings.

<3-1. Calling Agent>

Firstly, the user calls the agent by voice or gesture. The information processing device 100 analyzes information acquired from a space by the sensor device 300, and when the name of the agent or the system is called or when a predetermined gesture is recognized, an agent image is projected by the projector 210.

Figure 3:
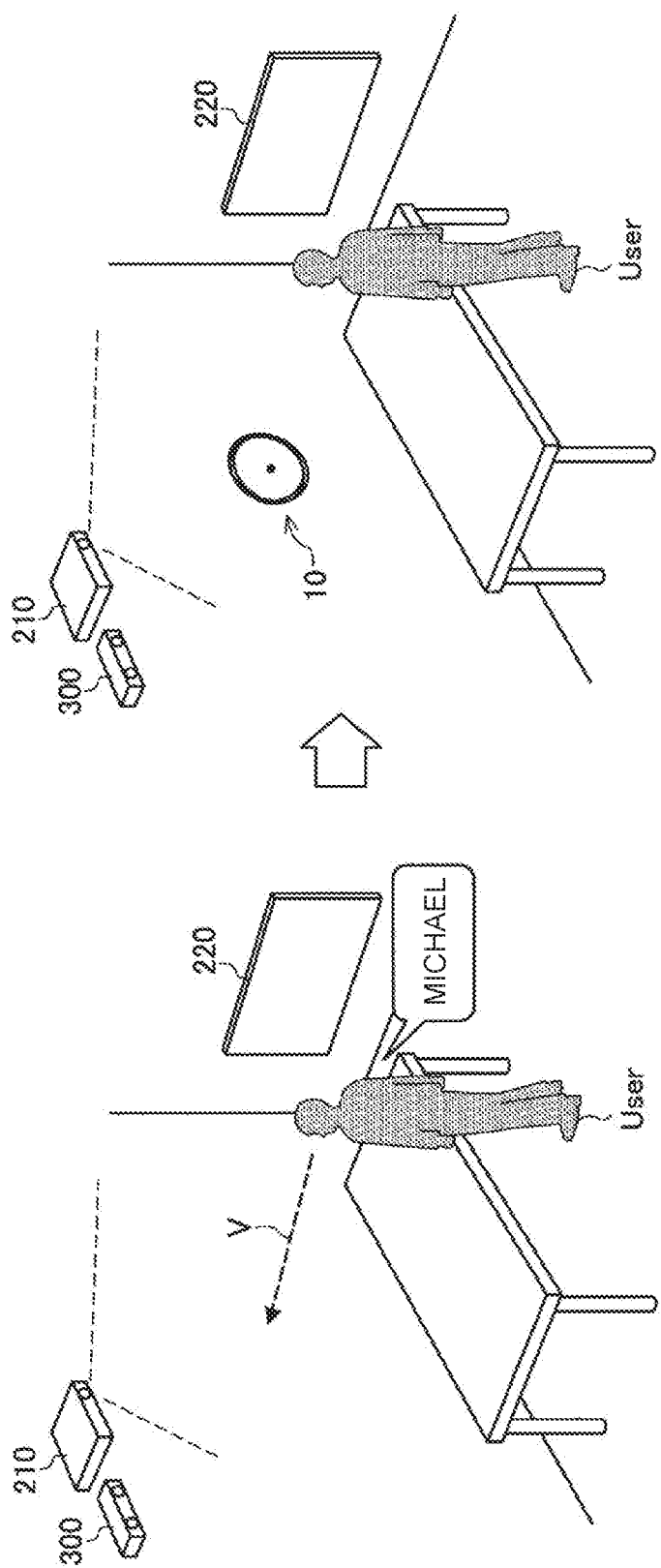
FIG. 3 is a diagram illustrating calling an agent by voice according to the present embodiment.

FIG. 3 is a diagram illustrating calling the agent by voice according to the present embodiment. As illustrated on the left side of FIG. 3, for example, when the user says "Michael", the name of the agent, the information processing device 100 identifies the speech and a direction of the user (position of the person who speaks) with an array microphone. Next, the information processing device 100 captures an image of the user located in a specified direction with a depth camera and recognizes a direction V in which the face of the user is directed (or the line of sight). Next, as illustrated on the right side of FIG. 3, the information processing device 100 displays the agent image 10 ahead of the direction V in which the face is directed by using the projector 210.

Figure 4:
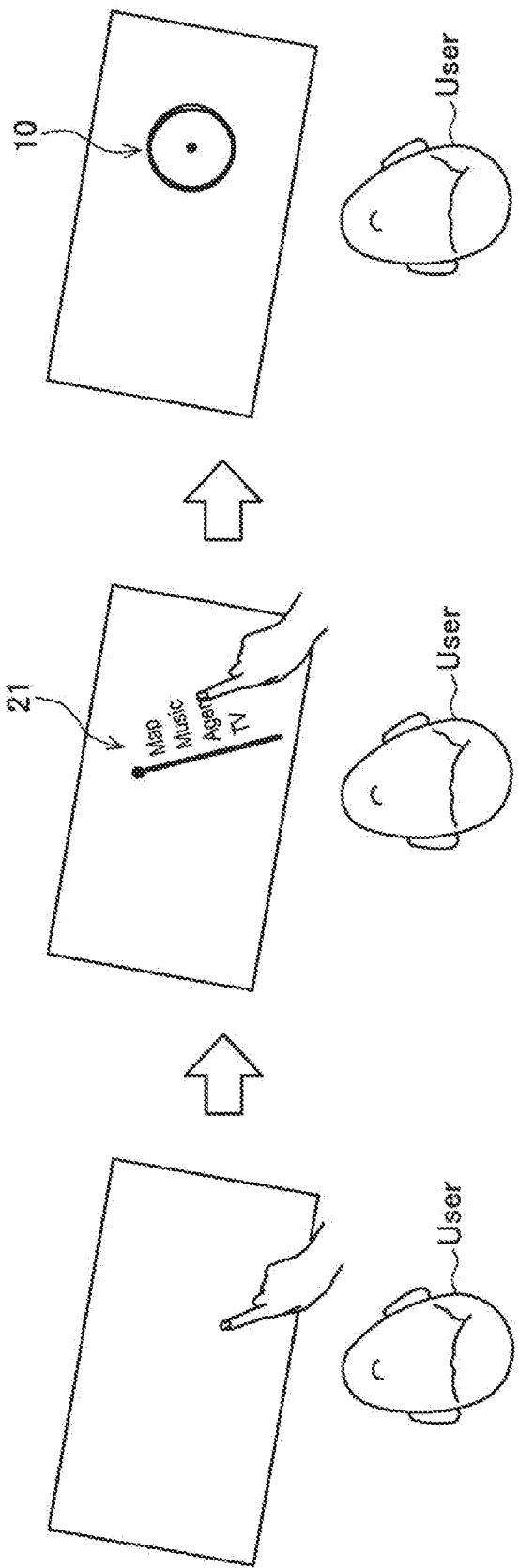
FIG. 4 is a diagram illustrating calling an agent by a menu UI according to the present embodiment.

FIG. 4 is a diagram illustrating calling the agent by a control UI according to the present embodiment. When the user taps a table, a wall, or the like, as illustrated on the left side of FIG. 4, the information processing device 100 projects and displays a menu UI 21 at the tapped position with the projector 210, as illustrated at the center of FIG. 4. Then, when the user selects an item "Agent" from the menu UI 21, the information processing device 100 projects and displays the agent image 10. In this case, the agent image 10 is displayed at the tapped position.

<3-2. Process of Device Control>

Figure 5:
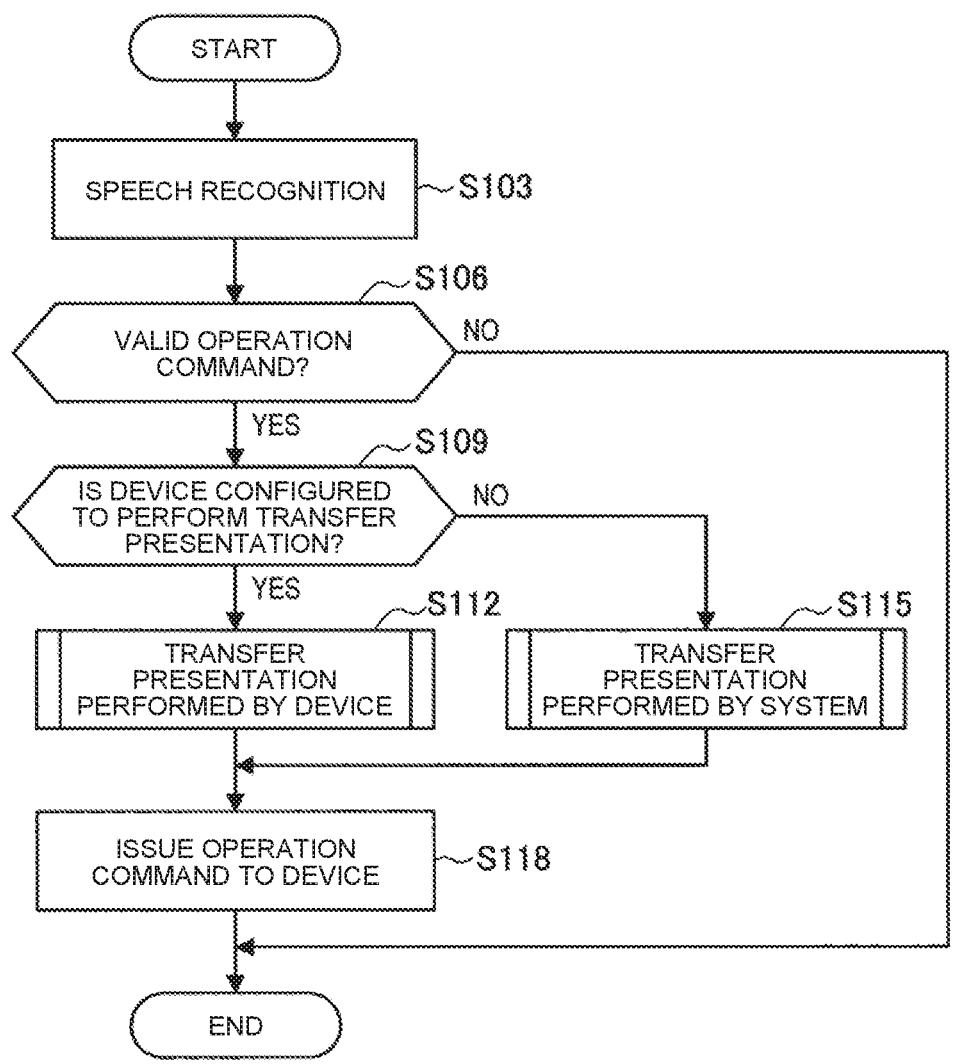
FIG. 5 is a flowchart illustrating an example of a process of device control performed in an information processing device of the system according to the present embodiment.

A description will be made of an operation process performed when the user controls a device via the agent after calling the agent, as described above, with reference to FIG. 5. FIG. 5 is a flowchart illustrating an example of a process of device control executed in the information processing device 100 of the system 1 according to the present embodiment.

As illustrated in FIG. 5, firstly, the information processing device 100 recognizes a user's speech on the basis of voice information acquired from the microphone 330 (step S103). For example, when the user says "Turn on the TV" to the agent, the information processing device 100 analyzes the content of the user's speech to effectively recognize the speech as a TV_ON command.

Next, the information processing device 100 recognizes a valid operation command from the user's spoken voice (step S106). If the command is a valid command, the information processing device 100 determines a destination device (control target device) to which the command is sent. For example, "Turn on the TV" indicates the TV 220, and "Play music" indicates a music player (or the speaker 260). When the recognition of speech fails (step S106/No), the information processing device 100 may end without doing anything, or may prompt the user to speak again, such as "Please speak again".

Next, the information processing device 100 determines whether the determined destination device is a device configured to perform transfer presentation (step S109). The transfer presentation represents feedback from a target device, which makes the user to intuitively understand that the system has acted on the device. In order to make the agent appear to transfer to a device, the feedback is referred to as "transfer presentation". The feedback from the device is assumed to be provided by, for example, image display, sound output, vibration, or predetermined movement. For example, since the TV 220 includes a display, the information processing device 100 determines that the transfer presentation is possible. Whether the transfer presentation can be performed may be inquired of a device by the information processing device 100 or may be determined on the basis of device information acquired in advance from the device.

Next, when the device is configured to perform transfer presentation (Step S109/Yes), the information processing device 100 controls the device to perform the transfer presentation (Step S112). Details will be described later with reference to FIG. 6.

On the other hand, if the device does not support the transfer presentation (step S109/No), the information processing device 100 controls the system to perform the transfer presentation (step S115). The transfer presentation by the system is a control that uses a device other than the control target device. For example, a predetermined image is projected on the control target device by the projector 210 so that the control target device appears to make a movement. Details will be described later with reference to FIG. 6.

After the output of the transfer presentation is completed, the information processing device 100 issues (sends) an operation command to the device (step S118). For example, when a recognized valid command is the TV_ON command, the information processing device 100 issues an operation command for switching input to the TV 220 to the input set last time. Specifically, for example, if the user was watching a digital terrestrial television broadcast on Channel 3 when power was turned off last time, a DIGITAL_3CH command is issued. In this case, the information processing device 100 sends a signal to High-Definition Multimedia Interface (HDMI (registered trademark)) 1. For example, when the transfer presentation is output by the device, it is possible to determined completion of output of the transfer presentation by reception of a completion notification from the device. Furthermore, when the transfer presentation is output by the system, for example, it is possible to determine completion of output of the transfer presentation by reception of a completion notification from the system.

<3-3. Transfer Presentation Process Performed by Device>

Figure 6:
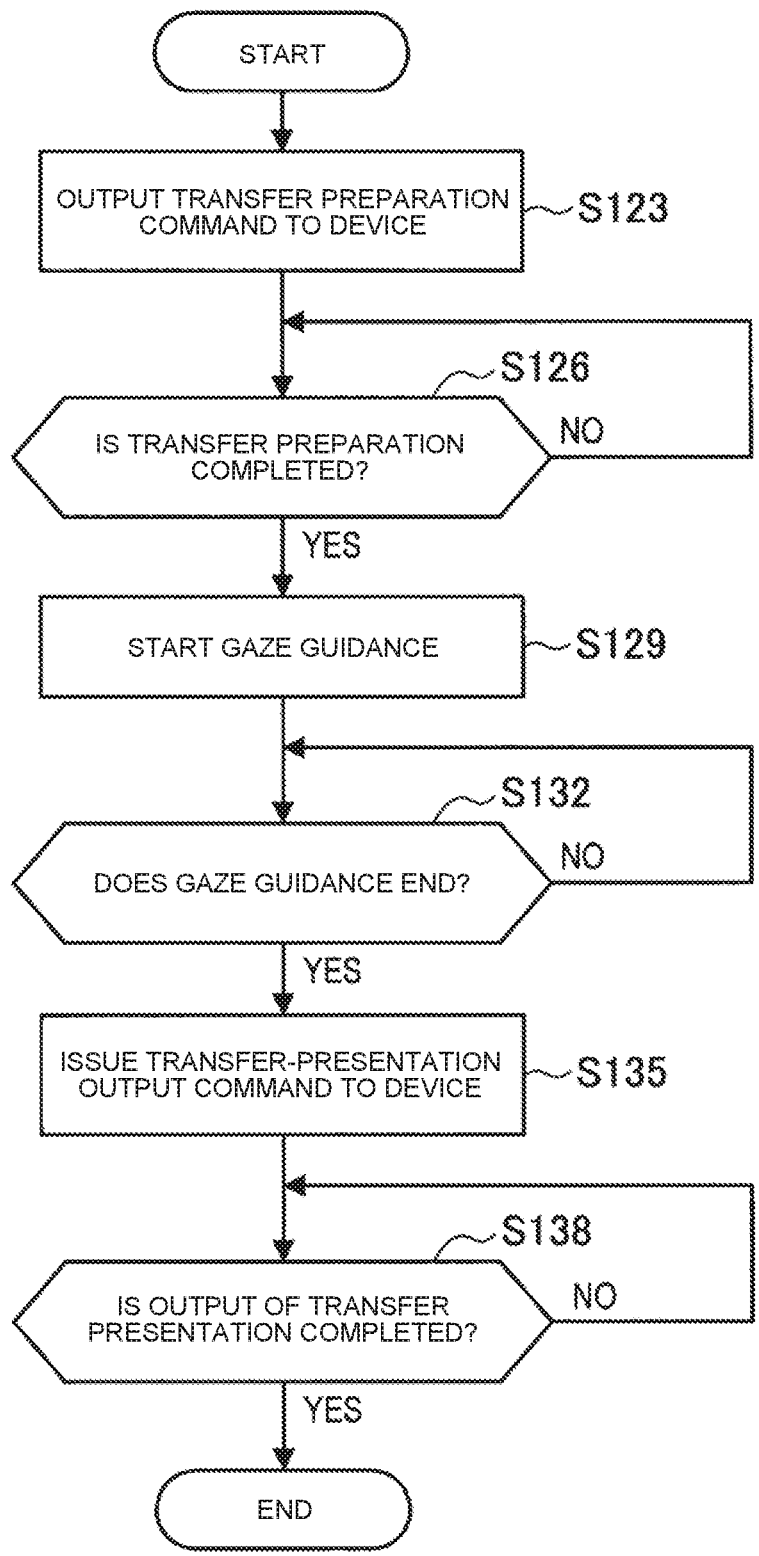
FIG. 6 is a flowchart illustrating an example of a transfer presentation process performed by a device according to the present embodiment.

FIG. 6 is a flowchart illustrating an example of a transfer presentation process performed by a device according to the present embodiment.

As illustrated in FIG. 6, firstly, the information processing device 100 outputs a transfer preparation command to the device (step S123). The transfer preparation command is used in preparation for outputting transfer presentation, making the device ready to perform feedback presentation. For example, when the TV 220 is employed, the TV 220 is turned on and switched to HDMI1. As a method of switching the inputs of the TV 220, DLNA (registered trademark) may be used, or a dedicated Web API may be used.

Next, if the transfer preparation by the device is completed (Step S126/Yes), the information processing device 100 starts gaze guidance (Step S129). Completion of the transfer preparation by the device may be confirmed by receiving a preparation completion notification from the device or may be regarded as preparation completion after a predetermined time has passed (timeout).

Figure 7:
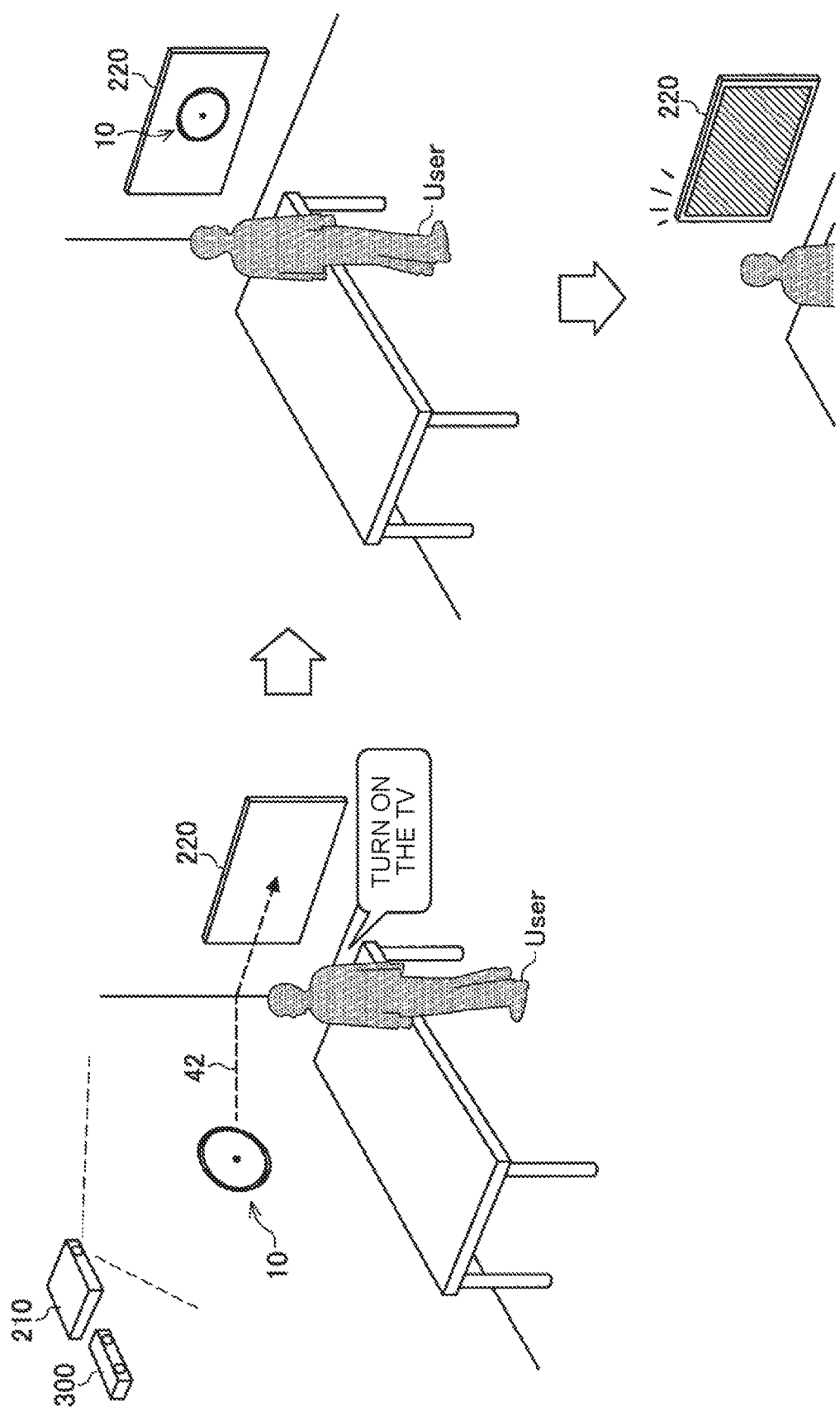
FIG. 7 is a diagram illustrating gaze guidance to a device and transfer presentation thereto by using an agent image according to the present embodiment.

The gaze guidance is processing of guiding a user's line of sight to a device and is performed by, for example, displaying a guide image in a direction of the user's line-of-sight. In the present embodiment, the agent image 10 having been already displayed (see FIGS. 3 and 4) is used as the guide image. For example, as illustrated at an upper left portion of FIG. 7, the information processing device 100 achieves the gaze guidance by moving the agent image 10 from a current display position (displayed in the direction of the user's line-of-sight) to the TV 220.

Figure 8:
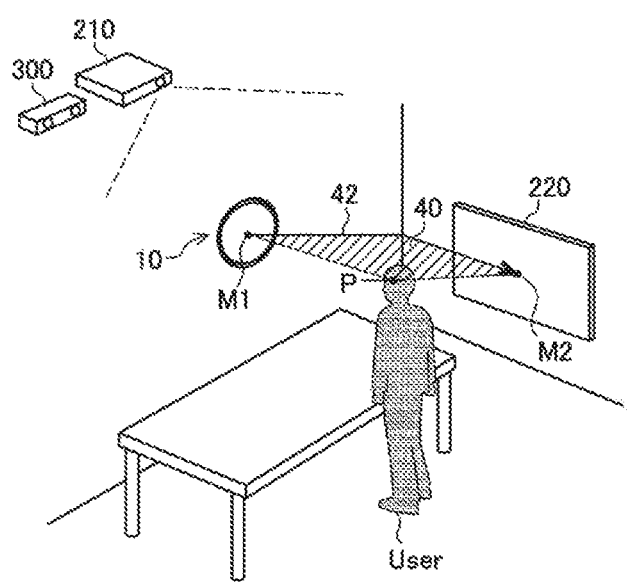
FIG. 8 is a diagram illustrating calculation of a trajectory in gaze guidance to a device by using the agent image according to the present embodiment.

At this time, the information processing device 100 calculates a trajectory 42 for the gaze guidance. Here, FIG. 8 is a diagram illustrating calculation of the trajectory for the gaze guidance. As illustrated in FIG. 8, the information processing device 100 may define a plane 40, calculate an intersection between the plane 40 and a wall surface in a real space, and obtain the trajectory 42, where the plane 40 includes three points of, for example, a source point M1 of the agent image 10, a viewpoint position P of the user, and a destination point M2 of the agent image 10. Note that the wall surface in the real space is recognized by a depth camera or the like. Furthermore, when a painting or another object is positioned on the trajectory 42 and is unsuitable for video projection, the information processing device 100 may calculate a trajectory to avoid the obstacle.

Figure 9:
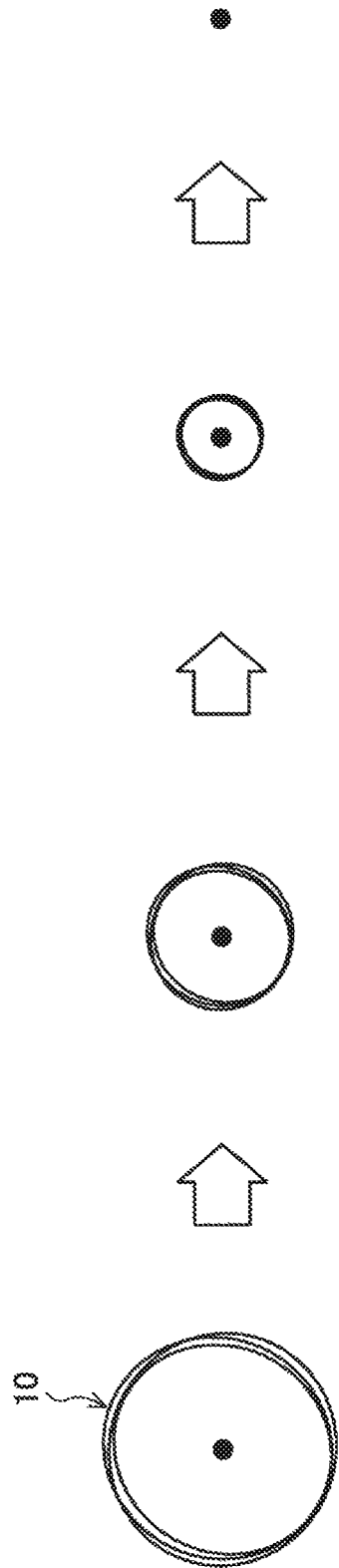
FIG. 9 is a diagram illustrating an example of deformation of the agent image, which is moving, according to the present embodiment.

The information processing device 100 outputs a gaze guidance animation according to the calculated trajectory 42. Specifically, as illustrated on the left side of FIG. 7, projection is controlled so that the agent image 10 moves from the current position to the TV 220 along the trajectory 42. At this time, the information processing device 100 may deform the agent image 10 to facilitate gaze guidance. For example, as illustrated in FIG. 9, the agent image 10 may be deformed into a mere point shape before moving so that the agent image 10 may be returned to the original shape upon reaching the position of the TV 220.

Furthermore, immediately after the start of gaze guidance, the information processing device 100 may set a moving speed of the agent image 10 to a slow speed (sufficiently slow so that the user can visually follow the agent image 10). This makes it possible to prevent the user from losing sight of the agent image 10. Furthermore, the information processing device 100 may recognize the direction of the user's line-of-sight with a depth camera or the like to sequentially determine whether the user is following the agent image 10. If the user seems to lose site thereof, the information processing device 100 may control, for example, the agent image 10 to hold the position or to blink so as to cause the user to find the agent image 10 again.

Next, if the gaze guidance ends (step S132/Yes), the information processing device 100 issues a transfer-presentation output command to the device (step S135). The gaze guidance may be finished when the guide image reaches the device or may be finished when the guide image reaches the device and the user looks at the device. Alternatively, the gaze guidance may be finished when the guide image reaches the device and a predetermined time has passed.

Figure 10:
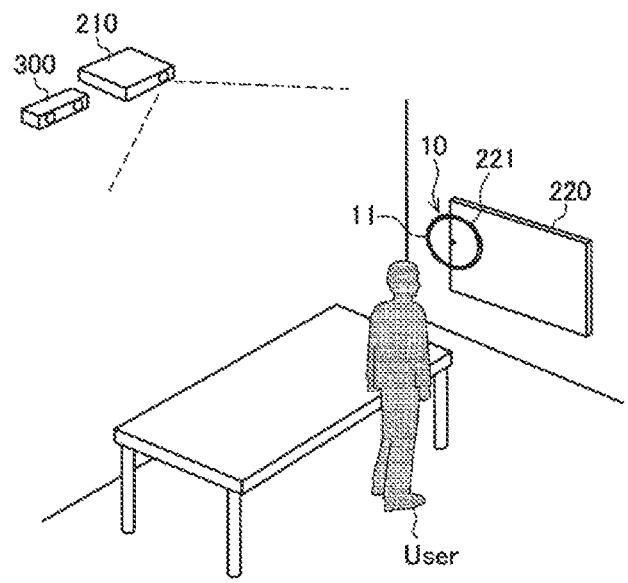
FIG. 10 is a diagram illustrating an example of agent transfer presentation according to the present embodiment.

Here, an example of the transfer presentation will be described. For example, when a destination is the TV 220, the information processing device 100 switches an output destination of the agent image 10 from the projector 210 to the TV 220 when the agent image 10 reaches the position of the TV 220. Thus, as illustrated in an upper right portion of FIG. 7, this makes it possible that the agent image 10 is displayed on the TV 220 and the user can recognize as if the agent transfers to the TV 220. At this time, instead of quickly switching the output from the projector 210 (i.e., gaze guidance) to the output from the TV 220 (i.e., output of the transfer presentation), the agent image 10 may be divided to be temporarily output at the same time from both of the projector 210 and the TV 220, as if part of the agent image 10 enters from a screen end of the TV 220, as illustrated in FIG. 10. In the example illustrated in FIG. 10, the agent image 10 includes a projection image 11 from the projector 210 and a display image 221 by the TV 220. This makes it possible to further effectively make the agent appear to transfer to the TV 220. Note that when the agent image 10 is shown as a dot as illustrated in FIG. 9 during the gaze guidance, the agent image 10 may be returned to show a normal shape after reaching the destination. In this way, the gaze guidance and the transfer presentation may be performed simultaneously.

Then, the information processing device 100 confirms the completion of output of the transfer presentation (step S138). The completion of output of the transfer presentation may be determined when a transfer-presentation output completion notification is received from the device or when a predetermined time has passed after issuing the transfer-presentation output command (timeout). Alternatively, the completion of output of the transfer presentation may be determined when the user looks at the transfer presentation. When the output of the transfer presentation is completed, the information processing device 100 issues an operation command to the device and causes the device to run the operation command, as described with reference to FIG. 5. Specifically, for example, as illustrated in a lower right portion of FIG. 7, the input to the TV 220 is switched to the channel set last time.

The example of the transfer presentation process according to the present embodiment has been described above. Note that the operation processing illustrated in FIG. 6 is an example, and the present disclosure is not limited to the example illustrated in FIG. 6. For example, a transfer presentation preparation process described in steps S123 to S126 and the gaze guiding process described in steps S129 to S132 may be performed in parallel. It is only necessary to complete the transfer presentation preparation at the end of the gaze guidance. Note that the information processing device 100 may perform control so that the timing of the end of the gaze guidance is matched with the timing of the completion of the transfer presentation preparation. For example, the time at which the agent image 10 reaches the target device (timing at which the gaze guidance is finished) may be adjusted by detouring, making useless movement of, or reducing the moving speed of the agent image 10.

Furthermore, for example, step S132 and step S135 may not be performed in the order illustrated in FIG. 6. In other words, as illustrated in FIG. 10, the gaze guidance and the transfer presentation may be performed simultaneously, and the information processing device 100 may perform processing of finishing the gaze guidance after issuing the transfer-presentation output command.

<3-4. Transfer Presentation Process Performed by System>

Figure 11:
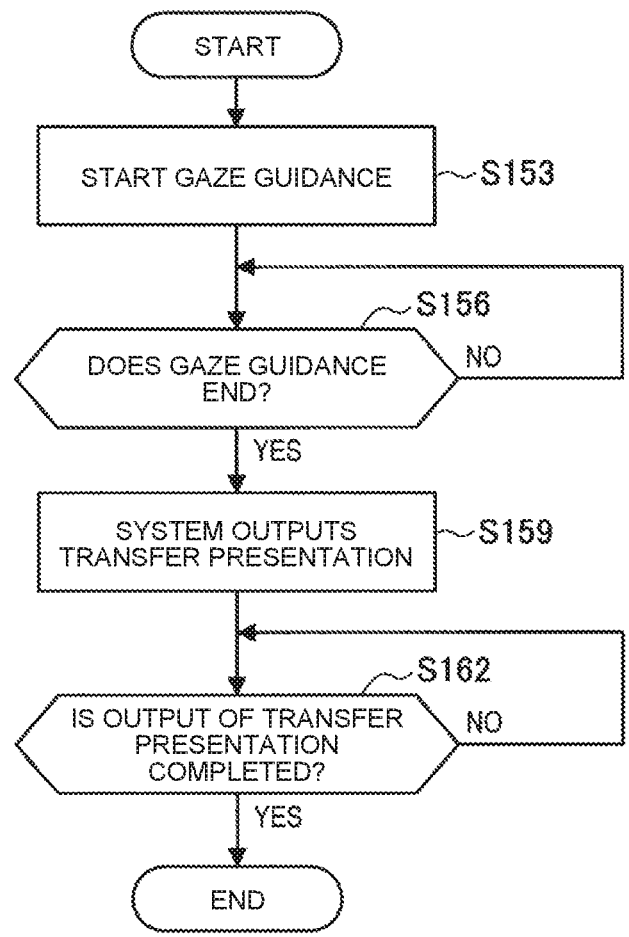
FIG. 11 is a flowchart illustrating an example of a transfer presentation process performed by the system according to the present embodiment.

FIG. 11 is a flowchart illustrating an example of a transfer presentation process performed by the system according to the present embodiment. If the device does not support the transfer presentation, the system outputs the transfer presentation.

As illustrated in FIG. 11, first, the information processing device 100 starts gaze guidance (step S153). Details of the gaze guidance are the same as those in steps S129 to S132 described above.

Next, if the gaze guidance ends (step S156/Yes), the information processing device 100 performs processing of outputting transfer presentation from the system (step S159). In other words, the output of the transfer presentation from the system is a control for making the user feel as if feedback is provided by the control target device by using a device other than the control target device (device that does not support the output of the transfer presentation). For example, the information processing device 100 may project an image causing the user to have an illusion that as if the device moves by outputting transfer presentation by projecting a predetermined video onto the control target device, illuminating around the device, performing projection mapping, or the like, with a projector 210 or the like.

Then, the information processing device 100 confirms the completion of output of the transfer presentation (step S162). The completion of the output of the transfer presentation may be determined when a transfer-presentation output completion notification is received from another device that is configured to output of the transfer presentation, for example, the projector 210 or when a predetermined time has passed (timeout) after the output of the transfer presentation is started by the projector 210. Alternatively, the completion of output of the transfer presentation maybe determined when the user looks at the transfer presentation.

The example of the transfer presentation process according to the present embodiment has been described above. Note that the operation processing illustrated in FIG. 11 is an example, and the present disclosure is not limited to the example illustrated in FIG. 11. For example, steps S156 and S159 may not be performed in the order illustrated in FIG. 11. In other words, the gaze guidance and the transfer presentation may be performed simultaneously or the information processing device 100 may perform the processing of finishing the gaze guidance after control of the output of the transfer presentation.

Furthermore, the information processing device 100 may output the preparation command for instructing the control target device to prepare for running the operation command, in parallel with the processing shown in steps S153 to S162. For example, in a case where the control target device takes a long time to start, if the control target device is activated before issuing the operation command and the gaze guidance and the transfer presentation are performed during the activation, the operation command can be run after completion of the output of the transfer presentation, with no waiting time.

<3-5. Supplementary Notes>

The process of device control according to the present embodiment has been specifically described above. Note that the operation processing illustrated in each of FIGS. 5, 6, and 11 is an example, and the present disclosure is not limited to the examples illustrated in FIGS. 5, 6, and 11. For example, it is not essential to output the transfer presentation that makes the agent appear to transfer, and the information processing device 100 may issue the operation command to the device after the gaze guidance. At this time, the information processing device 100 may issue the operation command to the device to cause the device to run the operation command, when the guide image reaches the position of the device, when the guide image reaches the position of the device and a predetermined time has passed, when the guide image reaches the position of the device and the user looks at the device, or when the operation command running preparation completion notification is received from the device (an operation command running preparation command has been sent to the device in advance).

Furthermore, the information processing device 100 may calculate the timing at which the gaze guidance is finished and issue the operation command to the device in advance. For example, the information processing device 100 may calculate a time required for the gaze guidance and send an instruction command for running the operation command after N seconds. Alternatively, the device may recognize the timing of finish of the gaze guidance and control a timing of running the operation command. For example, the device may run the operation command when receiving a notification of completion of the gaze guidance from the information processing device 100 or the device may run the operation command when receiving the notification of completion of the gaze guidance from the information processing device 100 and after a predetermined time has passed or when the user looks at the device.

Furthermore, the information processing device 100 may issue the instruction command for running the operation command in advance, after the device determines a timing at which the transfer presentation is finished. For example, the device finishes the transfer presentation and runs the operation command according to the instruction command, when the output of the transfer presentation is completed in the device, when a predetermined time has passed after the output of the transfer presentation, or when the transfer presentation is output and the direction of the user's line-of-sight is directed to the device (when the user looks at the transfer presentation).

4. APPLICATION EXAMPLES

The system according to the present disclosure may be applied to, for example, an entertainment, including but not limited to a home system.

(Competitive Bouldering)

Figure 12:
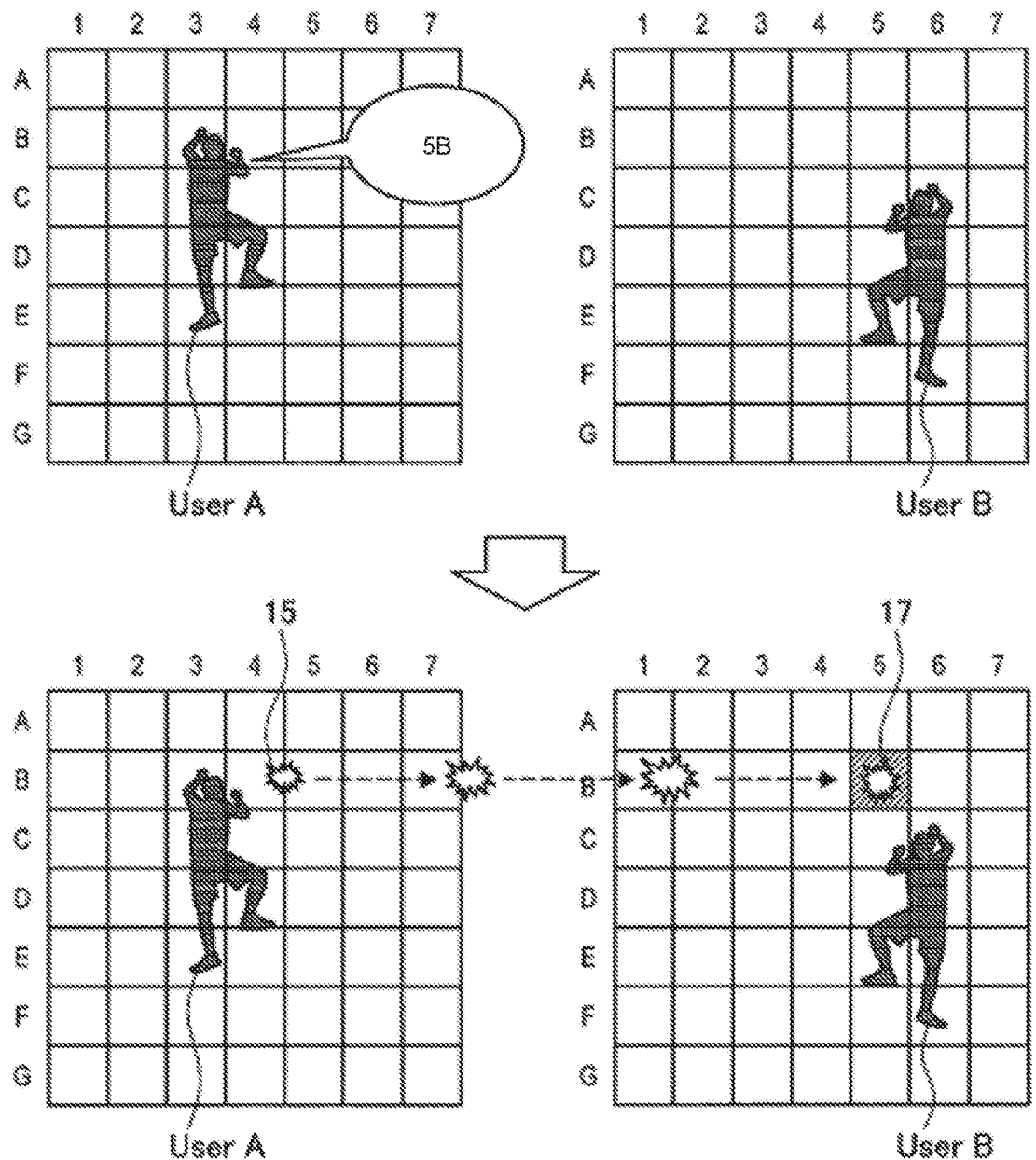
FIG. 12 is a diagram illustrating an example of application of the system according to the present embodiment to competitive bouldering.

For example, in competitive bouldering, when performing some control in response to a speech by one of the users, the system may be configured to output effect for gaze guidance to a control destination. FIG. 12 is a diagram illustrating an example of application to the competitive bouldering.

In the example illustrated in FIG. 12, a game is assumed in the competitive bouldering where a user A and a user B compete while climbing a wall, in which the users alternately specify opponent's holes by voice in order until there is no usable hole. For example, when the user A specifies "5B" by voice as illustrated on the upper side of FIG. 12, the system 1 may output an effect in which an effect image 15 flies from the vicinity of the user A to the designated opponent's hole, attacks the specified opponent's hole, and make the hole unusable, as illustrated on the lower side of FIG. 12.

Furthermore, in the competitive bouldering, the system 1 can perform control for outputting a similar effect as well in a game in which the users are positioned on the right and left sides, fixing both hands and feet of the users to preferred positions, the users specify areas by voice in order, and the first user who guesses the areas of the opponent's hands and feet wins.

In addition, such an effect can be applied to chess, Japanese chess, and the like, including but not limited to the competitive bouldering.

(Transformable Robot)

Figure 13:
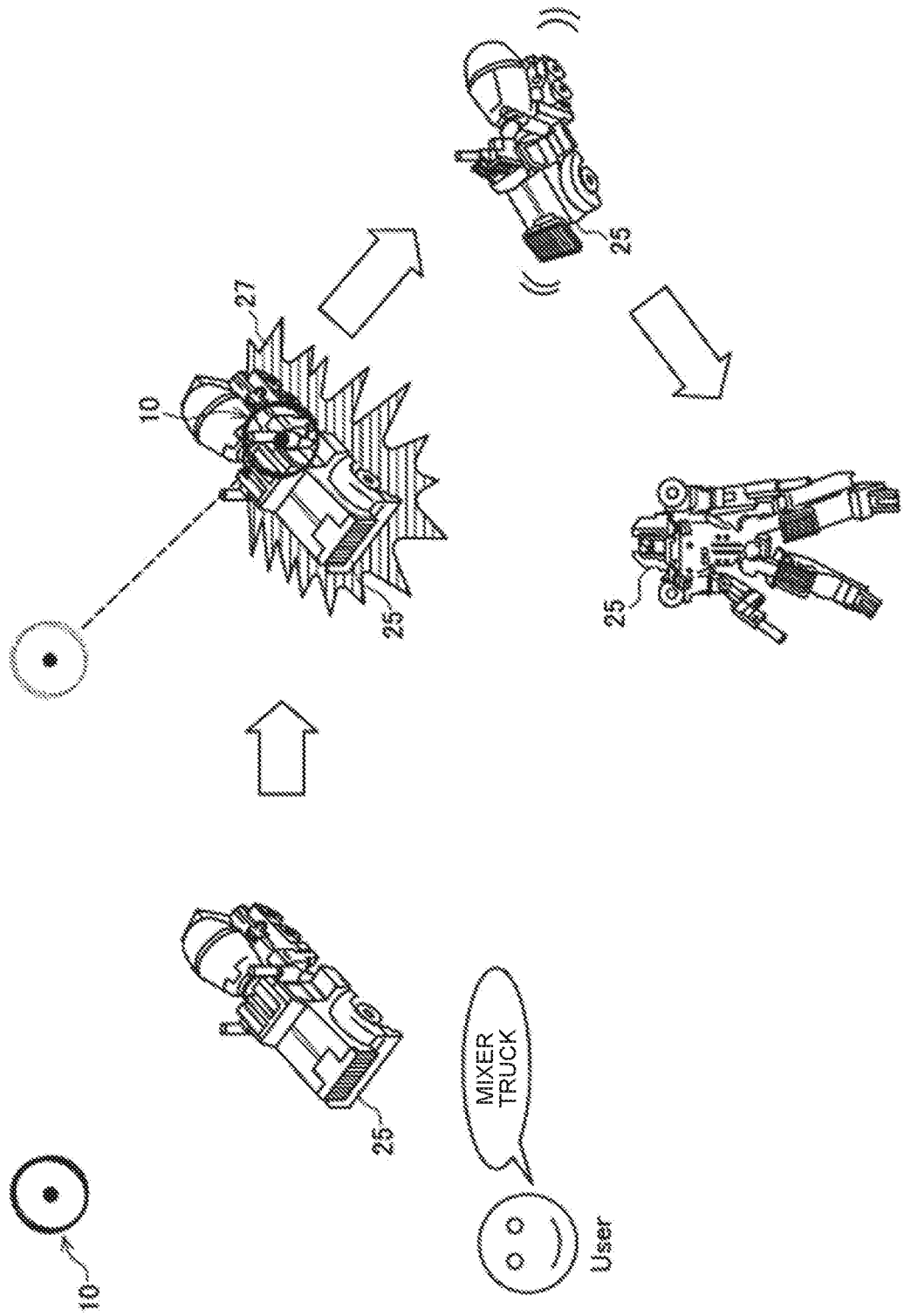
FIG. 13 is a diagram illustrating an example of application of the system according to the present embodiment to a transformable robot.

FIG. 13 is a diagram illustrating an example of application of the present system to a transformable robot. A robot 25 illustrated in FIG. 13 is a robot that is transformed by voice. For example, when the user selects a "mixer truck" and the robot 25, the system 1 moves the agent image 10 to the position of the robot 25, performs the user's gaze guiding process, and further projects an effect image 27 around the robot 25, and a presentation that makes the agent appear to transfer to the robot 25 is output. Meanwhile, the system 1 sends a preparation command to cause the robot 25 to perform a preparation operation for starting transformation during the gaze guidance and transfer presentation. This makes it possible to start the transformation after completion of output of the transfer presentation.

(Derived Example of Transfer Presentation)

For example, if the user says "Set an alarm clock for 8:00", the system 1 causes the agent to transfer to the alarm clock, but the output of the transfer presentation to the alarm clock may include turning around a clock hand, ring the alarm momentarily, or the like.

Furthermore, for example, if the user says "Boil some water in the electric kettle", the system 1 causes the agent to transfers to the electric kettle, but the output of the transfer presentation to the electric kettle may include projecting a video showing something like steam blasting from the electric kettle or the lid of the electric kettle opening and closing quickly.

Furthermore, for example, if the user says "Call grandma", the system 1 causes the agent to transfer to a phone, but as the output of the transfer presentation to the phone may include, for example, making a dialing sound from the phone Furthermore, for example, if the user says "Heat the bath water", the system 1 causes the agent to transfer to a bathroom, but output of the transfer presentation to the bathroom may include, for example, moving the agent image toward the bathroom for gaze guidance and outputting a sound such as "I will heat the bath water" from a speaker or the like near the bathroom.

Furthermore, for example, if the user says "Turn on the fan", the system 1 causes the agent to transfer to a fan, but output of the transfer presentation to the fan may include, for example, causing the fan to swing to the right and left.

Furthermore, for example, if the user says "Play music", the system 1 causes the agent to transfer to a speaker, but output of the transfer presentation to the speaker may include, for example, making a momentary sound (sound effects) from the speaker or causing the speaker to blink momentary in a case of the speaker with illumination.

(Trigger for Recognition of Valid Command)

The system 1 may be configured to recognize a valid command according to spatial environment, including not limited to the user's voice speech, gesture, or situation. For example, when room temperature is higher than a predetermined optimum temperature, the system may present a message to the user, for example, "Turn on the air conditioner because the temperature is high" to start to run a valid command.

(Modification of Transfer Presentation According to Device Status)

For example, if the TV 220 is already on, changing a video on the TV 220 to output the transfer presentation may hinder the user's watching. In this case, the system 1 may present the transfer by illuminating around the TV 220 by projection.

Furthermore, for example, when the TV 220 is already on and the user says "Channel 5" to cause the agent to switch the channel of the TV 220, it is unnecessary to output the transfer presentation or issue a preparation command to the TV 220. In this case, since the command requires prompt reaction for the user, the system 1 may issue an operation command immediately. When the user has already watched the TV 220, the system 1 displays the agent image 10 around the TV 220, and immediately runs the operation command.

(Application Example of Gaze Guidance)

In presentation of the gaze guidance, the presentation may be performed such that the agent does not move itself but visualizes a command and moves the command toward a device with the agent remaining at an original position. For example, the system 1 may project effects, for example, showing transmission of a radio wave from the agent image 10 to the position of the device.

Furthermore, when the user says "Turn on the TV and light", firstly, the gaze guidance to the TV 220 may be performed to turn on the TV 220, and then the gaze guidance to the light (lighting device or a switch of the lighting device) from the TV 220 may be performed to turn on the light. Alternatively, effect may be projected to visualize sequential or simultaneous issuance of commands from the agent image 10 to the TV 220 and the light (lighting device).

5. HARDWARE CONFIGURATION EXAMPLE

Figure 14:
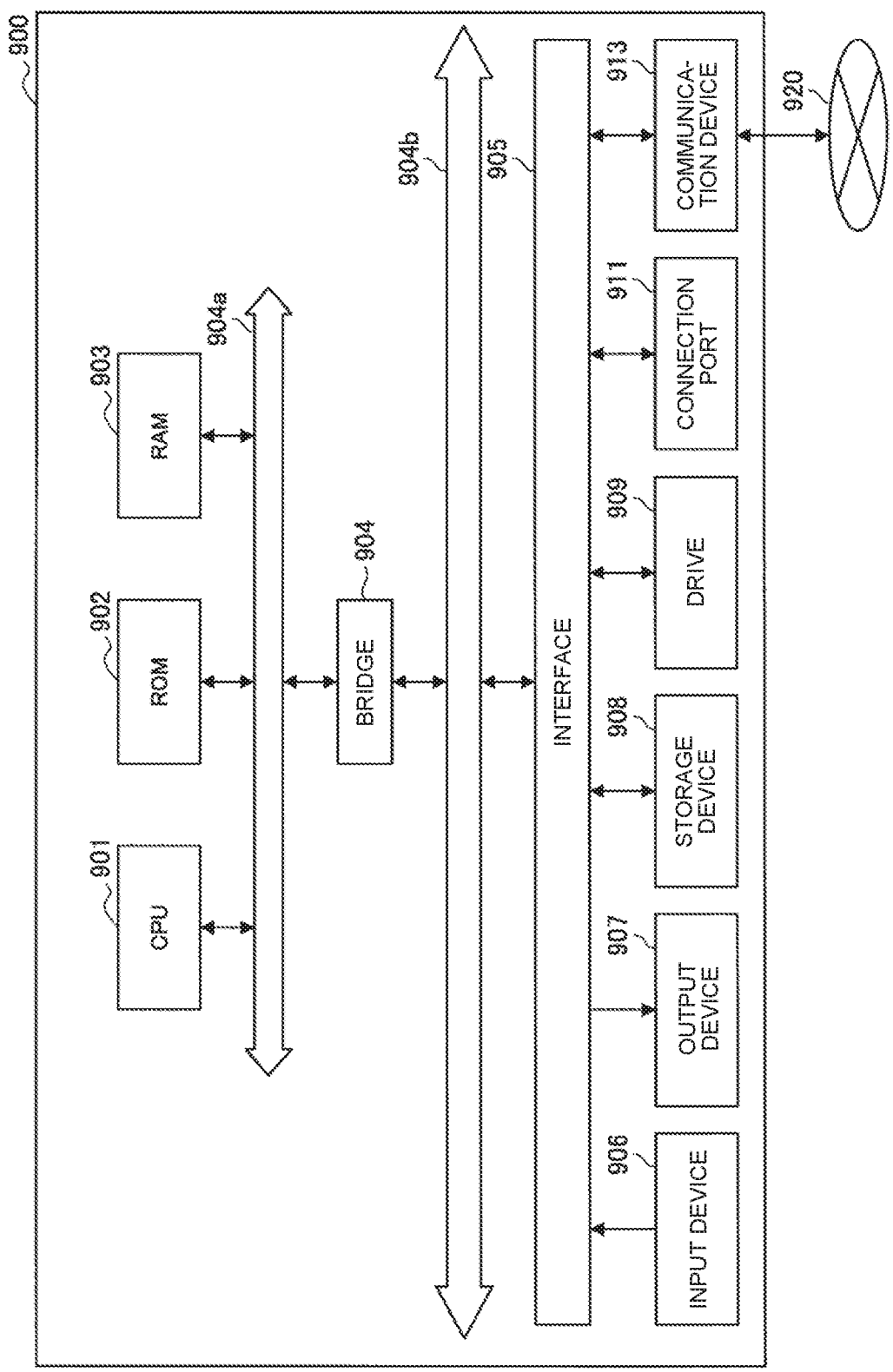
FIG. 14 is a block diagram illustrating a hardware configuration example of the information processing device according to the present embodiment.

Finally, a hardware configuration of an information processing device according to the present embodiment will be described with reference to FIG. 14. FIG. 14 is a block diagram illustrating the hardware configuration example of the information processing device according to the present embodiment. Note that the information processing device 900 illustrated in FIG. 14 can achieve, for example, the information processing device 100 illustrated in FIG. 2. Information processing performed by the information processing device 100 according to the present embodiment is achieved by cooperation between software and hardware which are described below.

As illustrated in FIG. 14, the information processing device 900 includes a central processing unit (CPU) 901, a read only memory (ROM) 902, a random access memory (RAM) 903, and a host bus 904a. The information processing device 900 includes a bridge 904, an external bus 904b, an interface 905, an input device 906, an output device 907, a storage device 908, a drive 909, a connection port 911, and a communication device 913. The information processing device 900 may include a processing circuit such as an electric circuit, DSP, or ASIC, instead of or in addition to the CPU 901.

The CPU 901 functions as an arithmetic processing device and a control device and controls the overall operation in the information processing device 900 according to various programs. Furthermore, the CPU 901 may be a microprocessor. The ROM 902 stores programs, operation parameters, and the like used by the CPU 901. The RAM 903 temporarily stores programs used in the execution of the CPU 901, parameters changing as appropriate during the execution thereof, and the like. The CPU 901 can form, for example, the gesture detection unit 120, the user detection unit 130, the environment detection unit 140, the device detection unit 150, and the control unit 170 which are illustrated in FIG. 2.

The CPU 901, ROM 902, and RAM 903 are connected to each other by the host bus 904a including a CPU bus or the like. The host bus 904a is connected to the external bus 904b such as a peripheral component interconnect/interface (PCI) bus via the bridge 904. Note that the host bus 904a, the bridge 904, and the external bus 904b are not necessarily configured separately, and the functions thereof may be mounted on one bus.

The input device 906 is achieved by a device to which information is input by the user, such as a mouse, keyboard, touch panel, button, microphone, switch, and lever. The input device 906 may include, for example, a remote control device that uses infrared light or another radio wave or may include an external connection device such as a mobile phone or PDA that supports the operation of the information processing device 900. Furthermore, the input device 906 may include, for example, an input control circuit that generates an input signal on the basis of information input by the user by using the input means described above and outputs the input signal to the CPU 901. The user of the information processing device 900 can operate the input device 906 to input various data to the information processing device 900 and instruct the information processing device 900 to perform a processing operation.

The output device 907 includes a device that is configured to visually or audibly notify the user of acquired information. Such a device includes a CRT display device, liquid crystal display device, plasma display device, EL display device, display device such as laser projector, LED projector, and lamp, sound output device such as speaker and headphone, printer device, and the like. For example, the output device 907 outputs results obtained by various processing performed by the information processing device 900. Specifically, the display device visually displays results obtained by various processing performed by the information processing device 900, in various formats, such as a text, image, table, or graph. On the other hand, the sound output device converts an audio signal including reproduced voice data, sound data, and the like into an analog signal and outputs the analog signal audibly.

The storage device 908 is a data storage device formed as an example of a storage unit of the information processing device 900. The storage device 908 is achieved by, for example, a magnetic storage unit device such as an HDD, a semiconductor storage device, an optical storage device, or a magneto-optical storage device. The storage device 908 may also include a storage medium, a recording device that records data on the storage medium, a reading device that reads data from the storage medium, a deletion device that deletes data recorded on the storage medium, and the like. The storage device 908 stores programs executed by the CPU 901, various data, various data acquired from the outside, and the like. The storage device 908 can form, for example, the storage unit 160 illustrated in FIG. 2.

The drive 909 is a storage medium reader/writer and is built in or externally attached to the information processing device 900. The drive 909 reads information recorded on a removable storage medium such as a mounted magnetic disk, optical disk, magneto-optical disk, or semiconductor memory and outputs the information to the RAM 903. Furthermore, the drive 909 is also configured to write information on the removable storage medium.

The connection port 911 is an interface connected to an external device and is a connection port with an external device to transmit data by, for example, a universal serial bus (USB). The connection port 911 can form, for example, the I/F unit 110 illustrated in FIG. 2. Then, the connection port 911 is connected to the output device 200 and the sensor device 300 illustrated in FIG. 2.

The communication device 913 is a communication interface including, for example, a communication device or the like for connection to a network 920. The communication device 913 includes, for example, a communication card or the like for wired or wireless local area network (LAN), Long Term Evolution (LTE), Bluetooth (registered trademark), or wireless USB (WUSB). The communication device 913 may be an optical communication router, Asymmetric Digital Subscriber Line (ADSL) router, various communication modems, or the like. The communication device 913 is configured to, for example, send and receive a signal or the like according to a predetermined protocol such as TCP/IP with the Internet or another communication device. The communication device 913 can form, for example, the I/F unit 110 illustrated in FIG. 2. Then, the communication device 913 can communicate with the output device 200 and the sensor device 300 illustrated in FIG. 2.

The network 920 is a wired or wireless transmission path for information sent from a device connected to the network 920. For example, the network 920 may include a public line network such as the Internet, a telephone line network, or a satellite communication network, various local area networks (LANs) including Ethernet (registered trademark), a wide area network (WAN), and the like. The network 920 may include a dedicated line network such as an Internet protocol-virtual private network (IP-VPN).

The hardware configuration example which can achieve the functions of the information processing device 900 according to the present embodiment has been described. Each of the above component elements may be achieved using general-purpose members or may be achieved by hardware specialized for the function of each component element. Therefore, it is possible to appropriately change the hardware configuration to be used according to technical level every time the present embodiment is carried out.

Note that it is possible to create a computer program for achieving each function of the information processing device 900 according to the present embodiment as described above and to mount the computer program on a PC or the like. In addition, a computer-readable recording medium storing such a computer program can also be provided. The recording medium includes, for example, a magnetic disk, optical disk, magneto-optical disk, or a flash memory. Furthermore, the above computer program may be distributed, for example, via a network without using a recording medium.

6. CONCLUSION

The preferred embodiments of the present disclosure have been described above in detail with reference to the accompanying drawings, but the present technology is not limited to such examples. Those skilled in the art may obviously find various alternations and modifications within the technical ideas as set forth in the scope of the appended claims, and it should be understood that the alternations and modifications will naturally come under the technical scope of the present disclosure.

For example, a computer program can also be created for causing hardware such as a CPU, a ROM, and a RAM built in the information processing device 100 to function as the information processing device 100. Furthermore, a computer-readable storage medium storing the computer program is also provided.

In addition, the effects described herein are merely illustrative and demonstrative and are not limitative. In other words, the technology according to the present disclosure can exhibit, along with or instead of the effects described above, other effects apparent to those skilled in the art from the description herein.

In addition, the present technique can also have the following structures.

(1)
An information processing device comprising
a control unit that executes:
a process of guiding a user's line of sight to a place of a control target device; and
a process of controlling timing of running an operation command in the control target device, according to timing of guiding the line of sight.

(2)

The information processing device according to (1), wherein the control unit performs control to send the operation command to the control target device at a timing at which the guiding of the line of sight is finished.

(3)

The information processing device according to (1), wherein the control unit performs control to send an instruction command for running the operation command to the control target device at a timing at which the guiding of the line of sight is finished.

(4)

The information processing device according to (2) or (3), wherein the control unit acquires three-dimensional position information of the control target device in a space, and projects a guide image from a projection device and moves the guide image to a position of the control target device to guide the user's line of sight.

(5)

The information processing device according to (4), wherein the timing at which the guiding of the line of sight is finished is a timing at which the guide image reaches the position of the control target device.

(6)

The information processing device according to (4), wherein the timing at which the guiding of the line of sight is finished is a timing at which the guide image reaches the position of the control target device and a direction of the user's line-of-sight is directed to the control target device.

(7)

The information processing device according to (4), wherein the timing at which the guiding of the line of sight is finished is a timing at which the guide image reaches the position of the control target device and at which a preparation completion notification for running of the operation command is received from the control target device.

(8)

The information processing device according to any one of (4) to (6), wherein the control unit performs control to move the guide image to the position of the control target device and then output transfer presentation to the control target device, and performs control to send the operation command to the control target device at a timing at which the control of output of the transfer presentation is completed.

(9)

The information processing device according to (8), wherein the control unit sends an output command for the transfer presentation to the control target device, after the guide image reaches a position of the control target device.

(10)

The information processing device according to (9), wherein the control unit sends the operation command to the control target device, when receiving a completion notification of output of the transfer presentation in the control target device.

(11)

The information processing device according to (9) or (10), wherein the output command for the transfer presentation is an instruction command for output of predetermined sound, image display, vibration, or movement made by the control target device.

(12)

The information processing device according to (11), wherein the output command for the transfer presentation is an instruction command for display of the guide image on a display unit of the control target device.

(13)

The information processing device according to any one of (9) to (12), wherein the control unit performs control to send, to the control target device, an instruction command for instructing the control target device to complete the transfer presentation and run the operation command, and the transfer presentation is completed when a predetermined time has passed after output of the transfer presentation or when the transfer presentation is output and a direction of the user's line-of-sight is directed to the control target device, after output of the transfer presentation is completed.

(14)

The information processing device according to (8), wherein the control unit, as the control of output of the transfer presentation, performs control to project the guide image onto the control target device, after the guide image reaches a position of the control target device.

(15)

The information processing device according to (14), wherein the control unit performs control to finish projection of the guide image onto the control target device and send the operation command to the control target device, and the projection of the guide image is finished after a predetermined time has passed or when a direction of the user's line-of-sight is directed to the control target device, after the guide image is projected onto the control target device.

(16)

The information processing device according to any one of (1) to (15), wherein the control unit generates the operation command based on an instruction acquired from a spoken voice of the user.

(17)

The information processing device according to any one of (1) to (15), wherein the control unit generates the operation command based on a situation of the user.

(18)
An information processing method comprising:
  guiding, by a processor, a user's line of sight to a place of a control target device; and
  controlling, by the processor, timing of running an operation command in the control target device, according to timing of guiding the line of sight.

(19)
A recording medium recording a program causing
  a computer to function as a control unit executing:
  a process of guiding a user's line of sight to a place of a control target device; and
  a process of controlling timing of running an operation command in the control target device, according to timing of guiding the line of sight.

REFERENCE SIGNS LIST

10 AGENT IMAGE
40 PLANE
42 TRAJECTORY
100 INFORMATION PROCESSING DEVICE
110 I/F UNIT
120 GESTURE DETECTION UNIT
130 USER DETECTION UNIT
140 ENVIRONMENT DETECTION UNIT
150 DEVICE DETECTION UNIT
160 STORAGE UNIT
170 CONTROL UNIT
171 DISPLAY CONTROL UNIT
173 SOUND CONTROL UNIT
200 OUTPUT DEVICE
210 PROJECTOR
230 TABLET
240 SMARTPHONE
260 SPEAKER
270 UNIDIRECTIONAL SPEAKER
300 SENSOR DEVICE
310 CAMERA
320 DEPTH SENSOR
330 MICROPHONE

The invention claimed is:

1. An information processing device comprising a control unit configured to:
  execute a process of guiding a user's line of sight to a place of a control target device;
  execute a process of controlling timing of running an operation command in the control target device, according to timing of guiding the line of sight, the timing of the guiding the line of sight including a first time at which the user's line of sight is detected to a second time at which the user's line of sight reaches the place of the control target device, the second time being after the first time;
  perform control to send the operation command from the information processing device to the control target device at a timing based on the second time; and
  project a guide image from a projection device and move the guide image to a position of the control target device to guide the user's line of sight,
  wherein the control unit is implemented via at least one processor.

2. The information processing device according to claim 1, wherein
  the control unit is further configured to perform control to send an instruction command for running the operation command to the control target device at a timing at which the guiding of the line of sight is finished.

3. The information processing device according to claim 1, wherein
  the control unit is further configured to acquire three-dimensional position information of the control target device in a space.

4. The information processing device according to claim 3, wherein
  the timing at which the guiding of the line of sight is finished is a timing at which the guide image reaches the position of the control target device.

5. The information processing device according to claim 3, wherein
  the timing at which the guiding of the line of sight is finished is a timing at which the guide image reaches the position of the control target device and a direction of the user's line of sight is directed to the control target device.

6. The information processing device according to claim 3, wherein
  the timing at which the guiding of the line of sight is finished is a timing at which the guide image reaches the position of the control target device and at which a preparation completion notification for running of the operation command is received from the control target device.

7. The information processing device according to claim 3, wherein
  the control unit is further configured to:
    perform control to move the guide image to the position of the control target device and then output transfer presentation to the control target device; and
    perform control to send the operation command to the control target device at a timing at which the control of output of the transfer presentation is completed.

8. The information processing device according to claim 7, wherein
  the control unit is further configured to send an output command for the transfer presentation to the control target device, after the guide image reaches a position of the control target device.

9. The information processing device according to claim 8, wherein
  the control unit is further configured to send the operation command to the control target device, when receiving a completion notification of output of the transfer presentation in the control target device.

10. The information processing device according to claim 8, wherein
  the output command for the transfer presentation includes an instruction command for output of predetermined sound, image display, vibration, or movement made by the control target device.

11. The information processing device according to claim 10, wherein
  the output command for the transfer presentation includes an instruction command for display of the guide image on a display unit of the control target device.

12. The information processing device according to claim 8, wherein
  the control unit is further configured to perform control to send, to the control target device, an instruction command for instructing the control target device to complete the transfer presentation and run the operation command, and the transfer presentation is completed when a predetermined time has passed after output of the transfer presentation or when the transfer presentation is output and a direction of the user's line of sight is directed to the control target device, after output of the transfer presentation is completed.

13. The information processing device according to claim 7, wherein
the control unit is further configured to, as the control of output of the transfer presentation, perform control to project the guide image onto the control target device, after the guide image reaches a position of the control target device.

14. The information processing device according to claim 13, wherein
the control unit is further configured to control to finish projection of the guide image onto the control target device and send the operation command to the control target device, and the projection of the guide image is finished after a predetermined time has passed or when a direction of the user's line of sight is directed to the control target device, after the guide image is projected onto the control target device.

15. The information processing device according to claim 1, wherein
the control unit is further configured to generate the operation command based on an instruction acquired from a spoken voice of the user.

16. The information processing device according to claim 1, wherein
the control unit is further configured to generate the operation command based on a situation of the user.

17. The information processing device according to claim 1, wherein the information processing device is different than the control target device.

18. An information processing method comprising:
guiding, by a processor, a user's line of sight to a place of a control target device;
controlling, by the processor, timing of running an operation command in the control target device, according to timing of guiding the line of sight, the timing of the guiding the line of sight including a first time at which the user's line of sight is detected to a second time at which the user's line of sight reaches the place of the control target device, the second time being after the first time;
performing, by the processor, control to send the operation command from the information processing device to the control target device at a timing based on the second time; and
projecting, by control of the processor, a guide image from a projection device and move the guide image to a position of the control target device to guide the user's line of sight.

19. A non-transitory computer-readable medium having embodied thereon a program, which when executed by a computer causes the computer to execute an information processing method, the method comprising:
guiding a user's line of sight to a place of a control target device;
controlling timing of running an operation command in the control target device, according to timing of guiding the line of sight, the timing of the guiding the line of sight including a first time at which the user's line of sight is detected to a second time at which the user's line of sight reaches the place of the control target device, the second time being after the first time;
performing control to send the operation command from the information processing device to the control target device at a timing based on the second time; and
projecting a guide image from a projection device and move the guide image to a position of the control target device to guide the user's line of sight.

* * * * *